(12) United States Patent
Chamelot et al.

(10) Patent No.: US 12,405,796 B2
(45) Date of Patent: Sep. 2, 2025

(54) METHOD FOR FETCHING ENCRYPTED INSTRUCTIONS, DECODING AND EXECUTING DECRYPTED INSTRUCTIONS, AND COMPARING INSTRUCTION SIGNATURES TO ENSURE EXECUTION INTEGRITY (71) Applicants: Commissariat à l'Energie Atomique et aux Energies Alternatives, Paris (FR); CENTRE NATIONAL DE LA RECHERCHE SCIENTIFIQUE, Paris (FR); SORBONNE UNIVERSITE, Paris (FR)

(72) Inventors: Thomas Chamelot, Grenoble (FR); Damien Courousse, Grenoble (FR); Karine Heydemann, Paris (FR)

(73) Assignees: Commissariat àl'Energie Atomique et aux Energies Alternatives, Paris (FR); CENTRE NATIONAL DE LA RECHERCHE SCENTIFIQUE, Paris (FR); SORBONNE UNIVERSITE, Paris (FR)

( * ) Notice: Subject to any disclaimer, the term of this patent is extended or adjusted under 35 U.S.C. 154(b) by 133 days.

(21) Appl. No.: 18/454,173

(22) Filed: Aug. 23, 2023

(65) Prior Publication Data

US 2024/0069917 A1 Feb. 29, 2024

(30) Foreign Application Priority Data

Aug. 24, 2022 (FR) ..................................... 22 08504

(51) Int. Cl.
*G06F 9/30* (2018.01)
*H04L 9/08* (2006.01)
*H04L 9/32* (2006.01)

(52) U.S. Cl.
CPC ........ *G06F 9/30178* (2013.01); *H04L 9/0894* (2013.01); *H04L 9/3247* (2013.01)

(58) Field of Classification Search
CPC .... G06F 9/30178; G06F 21/60; G06F 21/602; G06F 21/64
See application file for complete search history.

(56) References Cited

U.S. PATENT DOCUMENTS

| 11,734,009 B2 * | 8/2023 | Golombek .............. G06F 21/78 713/193 |
| 2005/0251708 A1 * | 11/2005 | Bancel .................... G06F 21/52 714/49 |

(Continued)

OTHER PUBLICATIONS

French Preliminary Search Report and Written Opinion issued Mar. 15, 2023 in French Application 22 08504 filed on Aug. 24, 2022, 11 pages (with English Translation of Categories of Cited Documents).

(Continued)

*Primary Examiner* — Jacob Petranek
(74) *Attorney, Agent, or Firm* — Oblon, McClelland, Maier & Neustadt, L.L.P.

(57) ABSTRACT

A method for executing a machine code with a computer, including constructing a signature for a current instruction on the basis of signals generated by a stage of a hardware processing path, this stage being a decoder or a stage following the decoder in the hardware processing path, and on the basis of the preceding signature constructed for an instruction which precedes it, then checking the integrity of the executed machine code by comparing the signature constructed for the current instruction with a prestored reference signature, then only when the integrity of the current instruction has been checked successfully, decrypting a cryptogram of the following instruction using the signature constructed for the current instruction.

12 Claims, 2 Drawing Sheets

(56) References Cited

U.S. PATENT DOCUMENTS

| | | | |
|---|---|---|---|
| 2009/0172414 A1* | 7/2009 | Dahan | G06F 21/85 |
| | | | 714/E11.002 |
| 2014/0082327 A1 | 3/2014 | Ghose | |
| 2014/0082329 A1 | 3/2014 | Ghose | |
| 2015/0286821 A1 | 10/2015 | Ghose | |
| 2020/0272475 A1* | 8/2020 | Courousse | G06F 21/12 |
| 2020/0302067 A1* | 9/2020 | Savry | G06F 9/323 |
| 2021/0218562 A1 | 7/2021 | Grobelny et al. | |
| 2022/0278837 A1 | 9/2022 | Grobelny et al. | |
| 2024/0012886 A1* | 1/2024 | Coulon | G06F 21/14 |

OTHER PUBLICATIONS

Werner et al., "Sponge-Based Control-Flow Protection for IoT Devices", 2018 IEEE European Symposium on Security and Privacy, 2018, 13 pages.

Chamelot et al., "SCI-FI: Control Signal, Code, and Control Flow Integrity against Fault Injection Attacks", 2022 Design, Automation & Test in Europe Conference & Exhibition, 2022, 4 pages.

Werner et al., "Protecting the Control Flow of Embedded Processors against Fault Attacks", 2016, 17 pages.

Clercq et al., SOFIA: Software and Control Flow Integrity Architecture, 2017, 6 pages.

Hiscock et al., Lightweight Software Encryption for Embedded Processors, 2017, 8 pages.

Savry et al., "CONFIDAENT: CONtrol Flow protection with Instruction and Data Authenticated ENcrypTion", 2020, 8 pages.

\* cited by examiner

METHOD FOR FETCHING ENCRYPTED INSTRUCTIONS, DECODING AND EXECUTING DECRYPTED INSTRUCTIONS, AND COMPARING INSTRUCTION SIGNATURES TO ENSURE EXECUTION INTEGRITY

The invention relates to a method for executing a machine code by means of a computer as well as to the machine code executed by this method. The invention also relates to:
an information storage medium and a computer for implementing this execution method, and
a compiler for generating this machine code.

In order to obtain information on a machine code or cause the machine code to operate in an unexpected manner, it is known practice to subject it to attacks known by the term "fault attack". These attacks consist in interfering with the operation of the computer when the machine code is executed by various physical means such as modifying the supply voltage, modifying the clock signal, exposing the computer to electromagnetic waves and others.

Using such interference, an attacker may corrupt the integrity of the machine instructions or of the data in order, for example, to find a secret key of a cryptographic system, to bypass security mechanisms such as checking a PIN code during authentication or simply to prevent a function which is essential to the security of a critical system from being executed.

A fault attack may cause the operation of the computer to be corrupted, for example by modifications of the instructions which are executed by the arithmetic logic unit. For this purpose, the injected faults frequently aim to interfere with the operation of the instruction decoder of the computer in order to produce faulty instructions.

When the interference with the decoder only prevents one or more of the instructions of the machine code from being executed or when the corruption has an effect on the processor which is equivalent to not executing the faulty instruction, instruction skipping is then spoken of. When the interference with the decoder leads one or more of the instructions of the machine code to be replaced by other instructions which can be executed by the computer, instruction replacement is then spoken of.

When the interference with the decoder modifies a branch instruction, an effect of diversion of the control flow is observed. The control flow corresponds to the execution path followed when the machine code is executed. The control flow is conventionally represented in the form of a directed graph known by the term "control flow graph". The effect of diversion of the control flow can be observed when a branch instruction is corrupted or when the condition involved in a conditional branch is modified or when the return address of a function is modified.

Such attacks are made easier if, beforehand, the machine code can be analysed. Thus, in order to make these attacks more difficult, it has been proposed to encrypt the instructions of the machine code in order to make it more complicated to analyse. One example of a method for executing an encrypted machine code is described in the following article: M. Werner, T. Unterluggauer, D. Schaenrath, and S. Mangard: "*Sponge-Based Control-Flow Protection for IoT Devices*", EuroS&P, 2018. This article is designated by the term "Werner2018" below.

The method described in Werner2018 is of particular interest because the cryptogram of each instruction is decrypted on the basis of an internal state of the computer which is updated in accordance with the cryptogram of the preceding decrypted instruction. Thus, the cryptogram of the current instruction to be executed can be decrypted correctly only if the cryptograms of all of the preceding instructions are intact, that is to say that they have not been modified, for example, by a fault attack. This is advantageous but does not make it possible to guard against an attack which causes only one error when an instruction is decoded. Indeed, in this latter case, as the decoding is carried out after the decryption of the instruction, the cryptogram of the instruction is not modified. In order to mitigate this drawback, Werner2018 additionally suggests, without describing it in more detail, constructing the internal state of the computer in accordance with the signals generated by the instruction decoder when the preceding instruction is decoded. This makes it possible to guarantee the integrity of the signals which are generated by the instruction decoder, in addition to the integrity of its cryptogram.

More specifically, in Werner2018, a faulty cryptogram of a current instruction $I_i$ or an error introduced when the instruction $I_i$ is decoded leads the cryptogram $I_{i+1}^*$ of the following instruction to be decrypted incorrectly. Thus, the decryption of the cryptogram $I_{i+1}^*$ produces an erroneous instruction $I'_{i+1}$ which is different from the expected instruction $I_{i+1}$. As the signals generated by the decoder when the instruction $I'_{i+1}$ is executed are taken into account for updating the state of the computer used to decrypt the cryptogram of the instruction $I_{i+2}$, on the basis of the instruction $I_i$, the computer generates only erroneous instructions. The first erroneous instruction $I'_{i+n}$ produced which does not belong to the instruction set of the computer causes an execution fault which halts the execution of the machine code. In the event that the instruction set of the computer is sparse, the index n of the instruction which causes the execution fault is small. In contrast, if the instruction set of the computer is not sparse, then the index n may be very large, this delaying the detection of the lack of integrity, or even making it impossible. In addition, if the instruction $I'_{i+1}$ belongs to the instruction set of the computer, this causes the computer to behave in an unexpected manner as the executed instruction $I'_{i+1}$ is different from the expected instruction $I_{i+1}$. Such unexpected behaviour may call the security of the machine code into question.

Prior art is also known from:
Chamelot Thomas et al: "SCI-FI: Control Signal, Code and Control Flow Integrity against Fault Injection Attacks", 2022 Design, Automation & Test In Europe Conference & Exhibition, EDAA, 14/03/2022, pages 556-559,
US2014/082327A1,
US2021/218562A1.

The article by Chamelot Thomas relates to the signature of an unencrypted machine code.

The invention aims to improve the method described in Werner2018. In particular, the invention therefore aims to propose a method for executing a machine code which makes it possible to signal corruption of an instruction, instruction skipping and corruption of the operation of the instruction decoder of the computer without having the drawbacks of the Werner2018 method. One of its subjects is therefore such a method for executing a machine code.

Another subject of the invention is a machine code which can be executed by implementing the above execution method.

Another subject of the invention is an information storage medium which can be read by a computer, this information storage medium containing the above machine code.

Another subject of the invention is a computer for implementing the above execution method.

Finally, another subject of the invention is a compiler which is able to automatically transform a source code of a computer program into a claimed machine code.

The invention will be better understood on reading the following description, which is given merely by way of non-limiting example and with reference to the drawings, in which.

SECTION I: NOTATIONS AND DEFINITIONS

In these figures, the same references have been used to designate the same elements. In the rest of this description, features and functions which are well known to a person skilled in the art are not described in detail.

In this description, the following definitions are adopted.

A "program" is a set of one or more predetermined functions which there is a desire to make a computer execute.

A "source code" is a representation of the program in a computer language, which cannot be directly executed by a computer and is intended to be transformed, by a compiler, into a machine code which can be directly executed by the computer.

A program or a code is said to be "directly executable" when it can be executed by a computer without this computer needing, beforehand, the program to be compiled by means of a compiler or to interpret it by means of an interpreter.

An "instruction" is a machine instruction which can be executed by a computer. Such an instruction is composed:
of an opcode, or operation code, coding the nature of the operation to be executed, and
of one or more operands defining the one or more values of the parameters of this operation.

The "value of an instruction" is a numerical value obtained, using a bijective function, on the basis of the sequence of "0"s and "1"s which codes, in machine language, this instruction. This bijective function may be the identity function.

A "machine code" is a set of machine instructions. This is typically a file containing a sequence of bits carrying the value "0" or "1", these bits coding the instructions to be executed by the microprocessor. The machine code can be directly executed by the computer, that is to say does not need to be compiled or interpreted beforehand. The machine code comprises a sequence of instructions that are organized one after another and which forms, in the machine code, an ordered series of instructions. The machine code begins with an initial instruction and ends with a final instruction. With respect to a given instruction $I_i$ of the machine code, the instruction $I_{i-1}$ located on the same side as the initial instruction is called the "preceding instruction" and the instruction $I_{i+1}$ located on the same side as the final instruction is called the "following instruction". The index "i" is the serial number of the instruction $I_i$ in the machine code.

A "binary code" is a file containing a sequence of bits carrying the value "0" or "1". These bits code data and instructions to be executed by the microprocessor. Thus, the binary code comprises at least one machine code and in addition, generally, numerical data processed by this machine code.

An "instruction stream" is a sequence of instructions which are executed one after another.

The notation "$I_i^*$" designates the cryptogram of the value of an instruction $I_i$ in cleartext.

In this text, a "series of consecutive instructions" is a group of instructions of the machine code which are systematically executed one after another.

A "branch instruction" is an instruction which, when it is executed by the computer, is able to replace the address contained in the program counter with another address. The branch instruction therefore comprises as a parameter at least this other address. Recall that the program counter contains the address of the next instruction to be executed by the computer. In the absence of a branch instruction, each time an instruction is executed, the program counter is incremented by the size of the instruction currently being executed. In the absence of a branch instruction, the instructions are systematically executed sequentially one after another in the order in which they are stored in a main memory, that is to say in the order of their index "i".

Execution of a function is spoken of in order to designate the execution of the instructions performing this function.

SECTION II: EXAMPLES OF EMBODIMENTS

Figure 1:
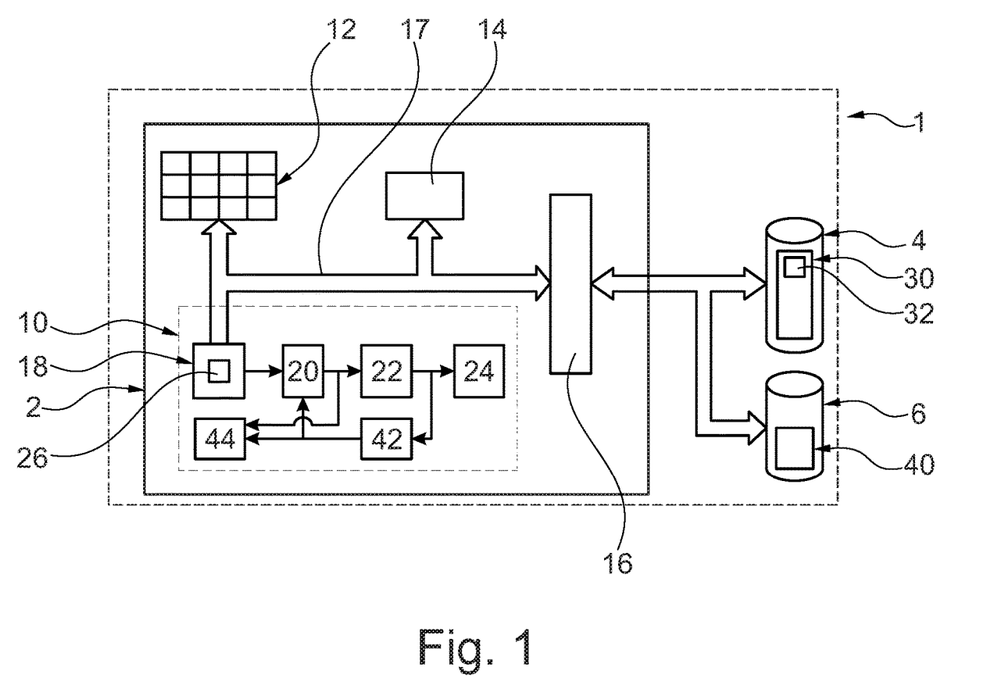
FIG. 1 is a schematic illustration of the architecture of an electronic computer which is able to execute a machine code.

FIG. 1 shows an electronic computer 1 comprising a microprocessor 2, a main memory 4 and a mass storage medium 6. For example, the computer 1 is a computer, a smartphone, an electronic tablet, a chip card or similar.

The microprocessor 2 here comprises:
a hardware path 10 for processing the instructions to be executed;
a set 12 of registers;
a control module 14;
a data input/output interface 16; and
a bus 17 which connects the various components of the microprocessor 2 to one another.

The memory 4 is configured to store instructions of a binary code 30 of a program which should be executed by the microprocessor 2. The memory 4 is a random-access memory. Typically, the memory 4 is a volatile memory. The memory 4 may be a memory which is external to the microprocessor 2, as shown in FIG. 1. In this case, the memory 4 is, for example, produced on a substrate mechanically separated from the substrate on which the various elements of the microprocessor 2, such as the path 10, are produced.

The medium 6 is typically a non-volatile memory. For example, it is an EEPROM or flash memory. It here contains a backup copy 40 of the binary code 30. Typically, it is this copy 40 which is automatically recopied into the memory 4 in order to restore the code 30, for example, after a power cut or similar or just before the code 30 begins to be executed.

In this example of an embodiment, the binary code 30 notably comprises an encrypted machine code 32. The machine code 32 contains a sequence of words $W_i$, each of the same size as the instruction which it contains. Typically, the size of each word $W_i$ in number of bits, is greater than eight or sixteen bits. Here, the size of each word $W_i$ is equal to thirty-two bits. Below, the index i is the serial number of the word $W_i$ in the machine code 32. Thus, the index i−1 corresponds to the word preceding the word $W_i$. Likewise, the index i+1 corresponds to the word following the word $W_i$. As explained below, each word $W_i$ contains either a cryptogram $I_i^*$ of an instruction $I_i$ to be executed or a cryptogram $Sref_i^*$ of a reference signature. Here the size of a word $W_i$ is equal to the size of the cryptogram which it contains. In this example of an embodiment, the words W containing a cryptogram $Sref_i^*$ represent less than 30% and, typically, less than 20% or less than 10% of the total number of words $W_i$ of the machine code 32. The other words $W_i$ of the machine code 32 each contain the cryptogram $I_i^*$ of an instruction to be executed.

By way of illustration, the microprocessor 2 is compliant with the ARM (Advanced Risk Machine) architecture version 7 and supports instruction sets such as Thumb 1 and/or Thumb 2. An instruction set limitingly defines the syntax of the instructions which the microprocessor 2 is able to execute. This instruction set therefore notably defines all of the possible opcodes for an instruction. The syntax of an instruction is incorrect if its syntax does not correspond to any of the possible syntaxes for an instruction which can be executed by the microprocessor 2. For example, if the bit range of an instruction $I_d$, which corresponds to the bit range used to code the opcode of the instruction, contains a value which is different from all the possible values for an opcode, then its syntax is incorrect.

In this example of an embodiment, the set 12 comprises general registers which can be used to store any type of data and dedicated registers. Unlike general registers, the dedicated registers are dedicated to the storage of particular data, generally automatically generated by the microprocessor 2.

The module 14 is configured to move data between the set 12 of registers and the interface 16. The interface 16 is notably able to acquire data and instructions, for example, from the memory 4 and/or the medium 6, which are external to the microprocessor 2.

The path 10 is better known by the term "pipeline". The path 10 makes it possible to start to execute an instruction of the machine code while the processing, by the path 10, of the preceding instruction of this machine code is not yet complete. Such processing paths are well-known and only the elements of the path 10 which are necessary to understanding the invention are described in more detail.

The path 10 typically comprises the following stages:
an instruction loader 18,
a decryption module 20,
an instruction decoder 22, and
an arithmetic logic unit 24 which executes the instructions.

The loader 18 loads the next instruction to be executed by the unit 24 from the memory 4. More specifically, the loader 18 loads the word $W_i$ of the machine code 32 to which a program counter 26 points. Unless its value is modified by the execution of a branch instruction, the value of the program counter 26 is incremented by a regular interval each time an instruction is executed by the arithmetic logic unit 24. The regular interval is equal to the difference between the addresses of two immediately consecutive instructions in the machine code 32. This interval is here called the "unit interval".

The decryption module 20 decrypts the loaded cryptogram and transmits the decrypted instruction $I_i$ to the decoder 22. The decrypted instruction $I_i$ is also called an "instruction in cleartext". For this purpose, the module 20 implements and executes a preprogrammed decryption function $g^{-1}(I_i^*, S_{-1})$, where:
$I_i^*$ is the cryptogram of the instruction $I_i$ in cleartext,
$S_{i-1}$ is a signature constructed for the preceding instruction $I_{i-1}$, and
$g^{-1}( )$ is the inverse of the encryption function $g( )$.

The construction of the signature $S_{i-1}$ is described below.

In this first embodiment, the function $g( )$ is a function which limits the statistical dependence between the value of $I_i$ and the value of $I_i^*$. Here, the function go is the "EXCLUSIVE OR" function represented by the symbol XOR. Thus, in this embodiment, the instruction $I_i$ in cleartext is obtained using the following relationship: $I_i = I_i^*$ XOR $S_{i-1}$.

The decoder 22 decodes the decrypted instruction $I_i$ in order to obtain configuration signals which configure the microprocessor 2 to execute, typically during the next clock cycle, the decrypted instruction. One of these configuration signals codes the nature of the operation to be executed by the unit 24. This configuration signal originates from/is constructed on the basis of the opcode of the decrypted instruction. Other configuration signals indicate, for example, whether the decrypted instruction is an instruction to load a datum from the memory 4 or to write a datum to the memory 4. These configuration signals are transmitted to the unit 24. Other configuration signals comprise the values of the operands loaded. According to the instruction to be executed, these signals are transmitted to the set 12 of registers or to the unit 24.

When the decoder 22 does not manage to decode an instruction, it generates an error signal. Typically, this occurs if the syntax of the decrypted instruction is incorrect.

The unit 24 executes the decrypted instructions one after another. The unit 24 is also capable of storing the result of executing these instructions in one or more of the registers of the set 12.

In this description, "execution by the microprocessor 2" and "execution by the unit 10" will be used as synonyms.

A given (machine) instruction $I_i$ should be processed sequentially, in order, by the loader 18, the decryption module 20, the decoder 22 and the unit 24. In addition, the loader 18, the decryption module 20, the decoder 22 and the unit 24 are capable of working in parallel with one another during the same clock cycle. Thus, during the same clock cycle, the loader 18 may be in the process of loading the cryptogram $I_{i+1}^*$ of the following instruction $I_{i+1}$, the decoder 22 in the process of decoding the decrypted instruction $I_i$ and the unit 24 in the process of executing the instruction $I_{i-1}$. The path 10 thus makes it possible to process several instructions of the machine code 30 in parallel. The module 20 decrypts the cryptogram $I_{i+1}^*$ after the instruction $I_i$ has been decoded by the decoder 22.

In order to ensure the integrity of the machine code 32, the path 10 additionally comprises the following hardware modules:
a signature constructor 42, and
an integrity checker 44.

The constructor 42 is configured to perform the following operations:
1) storing the preceding signature $S_{i-1}$ constructed for the preceding instruction $I_{i-1}$,
2) constructing a signature $S_i$ for the instruction $I_i$ on the basis of the preceding signature $S_{i-1}$ constructed and of the signals generated by the decoder 22 in response to the decoding of the instruction $I_i$.

In order to perform operation 2) above, the constructor 42 implements and executes a preprogrammed function $f(Id_i, S_{i-1})$, where:
$Id_i$ is a set of signals which are generated by the decoder 22 in response to the decoding of the instruction $I_i$, $S_{i-1}$ is the preceding signature constructed for the instruction $I_{i-1}$, and f( ) is a predetermined signature function.

Each signal generated by the decoder is in the form of a bit vector composed of the values 0 and 1. The set $Id_i$ contains the current values of each of the signals in the set. The set $I_d$, can be computed statically, that is to say can be computed before the machine code 32 is deployed in the memory 4. In other words, the set $Id_i$ can be computed at the moment when the machine code 32 is compiled. In addition, in this embodiment, if a useful bit of the instruction $I_i$ changes, at least one bit in the set $Id_i$ also changes. The useful bits of the instruction $I_i$ are those which contribute either to defining the opcode or to defining one of the operands of the instruction $I_i$. Thus, the set $Id_i$ varies in accordance with the opcode and with the value of each operand of the instruction $I_i$. For example, the set $Id_i$ generally comprises the signals for selecting the operands and the signals for controlling the unit 24.

The signature function f( ) has the following properties:
i) Collision resistance,
ii) Error preservation, and
iii) Non-associativity.

Collision resistance means that, knowing the signature $S_i$ of an instruction $I_i$, it is practically impossible to find an instruction $I'_i$ which is different from the instruction $I_i$ and which has the same signature $S_i$. In particular, it is practically impossible, by modifying only a few bits of the instruction $I_i$, to obtain an instruction which has the same signature $S_i$.

Error preservation means that, if a signature $S'_i$ is erroneous, that is to say if it is different from the expected signature $Sref_i$, then all the following signatures $S_{i+n}$ are also erroneous, where n is an integer greater than zero. This is made necessary by the fact that the function f( ) is a recursive signature function which constructs the current signature on the basis of the preceding signature.

By virtue of properties i) and ii), the integrity of an instruction $I_i$ can be confirmed or disconfirmed by checking the integrity of any following instruction $I_{i+n}$.

Non-associativity means that, however the order of the instructions $I_1$ to $I_{i-1}$ is modified, the signature $S'_i$ constructed for the instruction $I_i$ is different from the signature $S_i$ constructed if the order of the instructions $I_1$ to $I_{i-1}$ is not modified.

In addition, here, in order to ensure the confidentiality of the instructions of the machine code 32, the function f( ) has the following properties:
associating a different signature $S_i$ for each different instruction $I_i$,
behaving as a CSPRNG ("cryptographically secure pseudorandom number generator"), and
generating a signature of a size which is equal to or greater than the size of the instructions $I_i$.

For example, the function f( ) is a CBC-MAC ("cipher block chaining message authentication code") function. Still by way of illustration, in this CBC-MAC function, the encryption algorithm used is a block encryption algorithm, for example the encryption algorithm known by the name "Prince" (see, for example, about this algorithm, the following Wikipedia page: https://en.wikipedia.org/wiki/Prince_(cipher)). The "Prince" encryption algorithm is parametrized by a secret key $k_s$ which is only known to the computer 2 and to the compiler which generated the machine code 32. Typically, the key $k_s$ is stored in a secure memory of the signature constructor 42. Here, the signature $S_i$ is coded on the same number of bits as the instruction $I_i$.

Preferably, there is no machine code for executing the functions $g^{-1}$( ) and f( ) in a memory located outside the microprocessor 2. Typically, they are implemented in hardware form inside the module 20 and the constructor 42, respectively.

The checker 44 checks the integrity of the machine code decrypted and executed by the microprocessor 2. For this purpose, the checker 44 compares a signature $S_i$ constructed by the constructor 42 with a prestored reference signature $Sref_i$. If the signature $S_i$ is identical to the prestored signature $Sref_i$, then the machine code is intact. Otherwise, the checker 44 triggers the signalling of a lack of integrity. Typically, the signature $Sref_i$ is constructed when the machine code 2 is compiled.

In this embodiment, the signature $Sref_i$ is stored in the machine code 32. More specifically, immediately after the word $W_i$ of the machine code 32 which contains the cryptogram $I_i^*$, the machine code comprises a word $W_{i+1}$ which contains the cryptogram $Sref_i^*$ of the signature $Sref_i$. Here, the cryptogram $Sref_i^*$ is obtained using the same encryption function g( ) as that used to encrypt the instructions. For example, the cryptogram $Sref_i$ is obtained using the following relationship: $Sref_i^* = Sref_i$ XOR $Sref_{i-1}$, where the signature $Sref_{i-1}$ is that used when the code machine is compiled to encrypt the instruction $I_i$. As explained above in the case of the instructions $I_i$, an error in the decrypted or decoded instruction leads to an error in all the following signatures $S_{i+n}$ constructed by the constructor 42. Thus, in order to detect a lack of integrity, it is not necessary for the checker 44 to check the integrity of the machine code after each instruction $I_i$ has been executed. Here, the checker 44 checks the integrity of the machine code at locations chosen as being relevant in order to guarantee the security of the executed machine code. For example, in this embodiment, the checker 44 checks the integrity of the machine code after each branch instruction has been executed. To this end, after each branch instruction, the machine code 32 comprises a word $W_{i+1}$ containing the cryptogram $Sref_i^*$. In this embodiment, it is therefore the execution of a branch instruction which triggers the comparison of the signature $S_i$ constructed by the constructor 42 with the reference signature $Sref_i$ obtained by decrypting the cryptogram $Sref_i^*$ contained in the word $W_{i+1}$.

Figure 2:
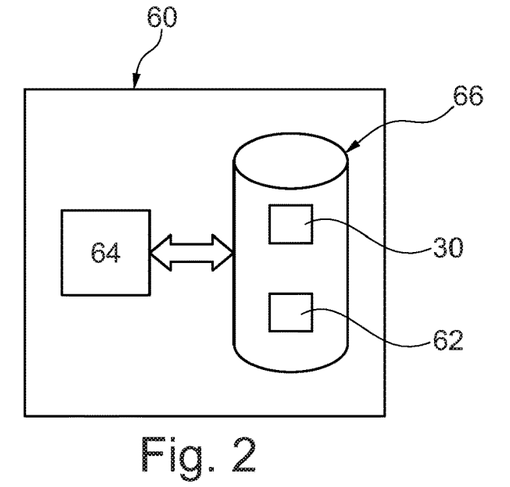
FIG. 2 is a schematic illustration of a compiler which is able to generate the machine code executed by the computer of FIG. 1.

FIG. 2 shows a compiler 60 which is able to automatically generate the machine code 32 on the basis of a source code 62. To this end, the compiler 60 typically comprises a programmable microprocessor 64 and a memory 66. The memory 66 contains the instructions and the data required, when they are executed by the microprocessor 64, to automatically generate the machine code 32 on the basis of the source code 62. In particular, the memory 66 contains the instructions required to execute the method of FIG. 3.

Figure 3:
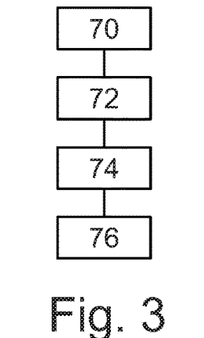
FIG. 3 is a flowchart of a method for compiling the machine code using the compiler of FIG. 2.

FIG. 3 shows a method for generating the machine code 32 on the basis of the source code 62 by means of the compiler 60.

During a step 70, the compiler 60 performs an initial compilation of the source code 62 in order to obtain a first machine code in cleartext in which the instructions $I_i$ are not encrypted. The first machine code does not comprise, at this stage, instructions which trigger the checking of the integrity of the machine code. The first machine code does not comprise reference signatures either.

During a step 72, the compiler 60 automatically transforms the first machine code into a second machine code which additionally contains the instructions which trigger the integrity check. To this end, the compiler 60 automatically identifies, in the first machine code, the locations where the instructions which trigger the integrity check should be inserted. Here, it identifies the locations of the branch instructions in the first code. Then, after each of these identified instructions, the compiler 60 automatically inserts a location making it possible to subsequently insert a reference signature.

During a step 74, the compiler generates, on the basis of the second machine code, a third machine code 32 in which each instruction $I_i$ is replaced by its corresponding cryptogram $I_i^*$.

For example, during the step 74, for each series of consecutive instructions, the compiler runs through this series of instructions in ascending order of the instructions $I_i$. Here, a series of consecutive instructions is a series of instructions of the second machine code which are systematically executed one after another when the machine code 32 is executed by the computer 2. For each instruction $I_i$ in cleartext encountered in this series of instructions, the compiler 60 constructs the signature $Sref_i$ to be used to obtain the corresponding cryptogram $I_{i+1}^*$. In the absence of an error, the signature $Sref_i$ constructed by the compiler 60 is the same as that which is constructed by the constructor 42 in order to decrypt the cryptogram $I_{i+1}^*$ when the machine code 32 is executed by the microprocessor 2. For this purpose, the compiler 60 constructs each signature $Sref_i$ using the same function f( ) as that used by the constructor 42. Thus, each signature $Sref_i$ is obtained using the following relationship: $Sref_i = f(Id_i, Sref_{i-1})$. For example, for this purpose, the compiler 60 implements a simulator which reproduces the operation of the path 10 and, in particular, of the decoder 22 and of the constructor 42. In particular, the emulator runs through the second machine code and, for each instruction $I_i$ of the second machine code:

the simulator produces the same configuration signals as those produced by the decoder 22 when it has finished decoding the instruction $I_i$, then the simulator constructs the signature $Sref_i$ on the basis of the set $Id_i$ of these signals and of the preceding signature $Sref_{i-1}$ constructed using the function f( ).

In this embodiment, in order to encrypt the first instruction $I_1$ of the machine code, the compiler uses a predetermined reference signature $Sref_0$ known to the microprocessor 2. Typically, the signature $Sref_0$ is a secret signature known only to the microprocessor 2 and to the compiler 60. For example, the signature $Sref_0$ is stored in a secure memory of the microprocessor 2 and used by the constructor 42 to decrypt the cryptogram contained in the first word $W_1$ of the machine code 32.

Once the signature $Sref_i$ has been constructed, the compiler 60 obtains the cryptogram $I_i^*$ using the relationship $I_i^* = g(I_i; Sref_{i-1})$, where the function g( ) is the inverse of the function $g^{-1}$ ( ) that is to say that it satisfies the following relationship: $I_i = g^{-1}(g(I_i))$. In this example, the cryptogram is obtained using the following relationship: $I_i^* = I_i$ XOR $Sref_{i-1}$. Each instruction $I_i$ of the second machine code is then replaced by its cryptogram $I_i^*$ in order to obtain the third machine code.

The second machine code may comprise branch instructions so that the instruction preceding an instruction $I_i$ may be either the instruction $I_{i-1}$ or another instruction $I_j$ according to the path taken. In this case, the instruction $I_i$ has several preceding instructions $I_{i-1}$ and $I_j$. In contrast, there can be only one single cryptogram $I_i^*$. Here, the cryptogram $I_i^*$ is either equal to $g(I_i; Sref_{i-1})$ or equal to $g(I_i; Sref_j)$. In order for the cryptogram $I_i^*$ to be the same whatever path is taken, it is necessary for the signature $Sref_j$ to be identical to the signature $Sref_{i-1}$. To this end, a mechanism for updating the signature $Sref_j$ is implemented. For example, here, the mechanism for updating the signatures known by the acronym GPSA ("Generalized Path Signature Analysis") is implemented. The GPSA mechanism is, for example, described in the following article: Mario Werner et al: "Protecting the Control Flow of Embedded Processors against Fault Attacks", CARDIS 2015: Revised Selected Papers of the 14th International Conference on Smart Card Research and Advanced Applications—Volume 95, 14 Nov. 2015, Pages 161-176. As the mechanism for updating the signatures is known, the update of the signatures in the event that an instruction has several preceding instructions is not described in this text. In other words, below, the description is given in the particular case of a series of immediately consecutive instructions, in the knowledge that a person skilled in the art knows how to apply this teaching in the event that the control flow of the machine code has several forks corresponding, typically, to conditional branch instructions.

During a step 76, immediately after the cryptogram $I_i^*$ of each instruction which triggers the identity check, the compiler automatically inserts a word WEI containing the cryptogram $Sref_i^*$ in order to obtain the machine code 32.

In this embodiment, the cryptogram $Sref_i^*$ is obtained using the following relationship: $Sref_i^* = g(Sref_i; Sref_{i-1})$, where $Sref_i$ and $Sref_{i-1}$ are the signatures constructed for the instructions $I_i$ and $I_{i-1}$, respectively, during the step 74.

Figure 4:
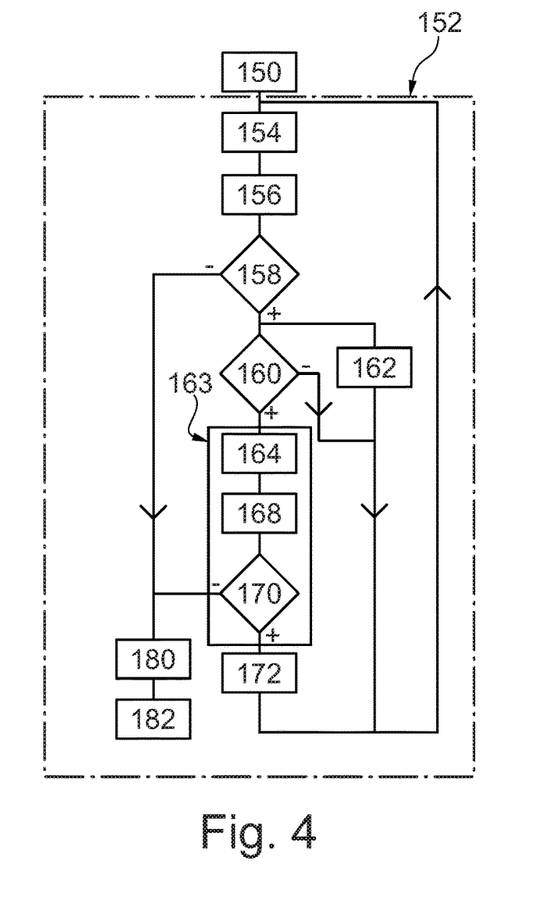
FIG. 4 is a flowchart of a method for executing the machine code using the computer of FIG. 1.

FIG. 4 shows a method for executing the machine code 32 by means of the computer 2.

The method begins with a step 150 of delivering the binary code 30 to the memory 4. For this purpose, for example, the microprocessor 2 recopies the copy 40 inside the memory 4 in order to obtain the binary code 30 stored in the memory 4. Beforehand, this binary code 30 was generated by the compiler 60 by implementing the method of FIG. 3.

Then, during a phase 152, the microprocessor 2 executes the binary code 30 and, in particular, the machine code 32.

For this purpose, for each word $W_i$ pointed to by the program counter 26, the path 10 sequentially executes the following steps:

a step 154 of the loader 18 loading the word $W_i$ pointed to by the current value of the program counter 26, then a step 156 of the module 20 decrypting the cryptogram contained in the word $W_i$ loaded in order to obtain an instruction $I_i$ in cleartext, a step 158 of the decoder 22 decoding the instruction $I_i$ in cleartext, then a step 160 of the unit 24 executing the decoded instruction $I_i$.

In addition, for example in parallel with the step 160, during a step 162, the constructor 42 constructs the signature $S_i$ on the basis of the set $I_d$, of signals which are generated by the decoder 22 at the end of the step 158 and of the previous signature $S_{i-1}$ constructed. The signature $S_i$ thus constructed is then transmitted to the decryption module 20, which is then in a position to decrypt the cryptogram $I_{i+1}^*$ of the next instruction to be executed.

If, during the step 160, the executed instruction $I_i$ is not an instruction which triggers the integrity check, then the program counter 26 is incremented by the unit interval in order to point to the following word $W_{i+1}$ and the method returns directly to the step 154 in order to execute the following instruction $I_{i+1}$.

If, during the step 160, the executed instruction $I_i$ is an instruction which triggers the integrity check, then the processing path 10 executes a step 163 of checking the integrity of the machine code executed thus far.

Here, this step 163 comprises the following operations:
an operation 164 of the loader 18 loading the word $W_{i+1}$ which immediately follows the word $W_i$ which contains the cryptogram $I_i^*$, then
an operation 168 of the module 20 decrypting the cryptogram $Sref_i^*$ contained in the word $W_{i+1}$ in order to obtain the signature $Sref_i$ in cleartext, then
an operation 170 of the checker 44 comparing the signature $S_i$ constructed for the instruction $I_i$ with the signature $Sref_i$ obtained at the end of the operation 168.

The address of the word $W_{i+1}$ containing the cryptogram $Sref_i^*$ is deduced from the value of the program counter 26. For example, here, the address of the word $W_{i+1}$ is equal to the address contained in the program counter 26 after the instruction $I_i$ has been executed.

Then, if the compared signatures $S_i$ and $Sref_i$ are identical, the method continues with a step 172 during which the program counter 26 is incremented in order to point directly to the word $W_{i+2}$. After the step 172, the method returns to the step 154 in order to execute the instruction $I_{i+2}$.

Conversely, if the compared signatures $S_i$ and $Sref_i$ are different, the method continues with a step 180 during which a lack of integrity is signalled.

In addition, during the step 158, if an instruction $I_i$ cannot be decoded as its syntax is incorrect, the method also continues with the step 180 of signalling a lack of integrity. During this step 180, the decoder 22 triggers the signalling of a lack of integrity.

In response to a signalling of a lack of integrity, during a step 182 the microprocessor 2 implements one or more countermeasures. Very many countermeasures are possible. The implemented countermeasures may have very different degrees of severity. For example, the implemented countermeasures may from raising an interruption to definitively putting the microprocessor 2 out of service and deleting sensitive data. The microprocessor 2 is considered to be out of service when it is definitively placed in a state in which it is incapable of executing any machine code. Between these extreme degrees of severity, there are many other possible countermeasures, such as:
indicating, via a human-machine interface, that the faults have been detected,
immediately interrupting the execution of the machine code 32 and/or reinitializing it, and
deleting the machine code 32 from the memory 4 and/or deleting the backup copy 40 and/or deleting the secret data.

The steps 154, 156, 158 and 160 are typically each executed in one clock cycle. In addition, some of these steps are, preferably, executed in parallel for various sequential instructions of the machine code 32. For example, the path 10 may execute, in parallel:
the step 154 of loading the cryptogram $I_{i+1}^*$
the step 158 of decoding the instruction $I_i$, and
the step 160 of executing the instruction $I_{i-1}$.

SECTION III: VARIANTS

Variants of the Computer:

The memory 4 may also be a non-volatile memory. In this case, it is not necessary to copy the binary code 30 inside this memory before it starts to be executed as it is already there.

The memory 4 may also be an internal memory integrated inside the microprocessor 2. In this latter case, it is produced on the same die as the other elements of the microprocessor 2. Finally, in other configurations, the memory 4 is composed of several memories, some of which are produced on the die of the microprocessor and others of which are produced on another die, which is mechanically independent of the die of the microprocessor.

In one variant, the operation of loading the word $W_i$ and the operation of decrypting the word $W_i$ are performed during the same clock cycle by the loading stage. In other words, in this variant, the decryption module 20 is integrated into the loader 18. In another variant, the operation of decrypting the cryptogram $W_i$ and the operation of decoding the instruction $I_i$ are performed during the same clock cycle. In other words, in this variant, the decryption module 20 is integrated into the decoder 22. It is also possible to place the decryption module 20 anywhere between the instruction memory and the instruction loader 18. In this case, the instruction loader 18 loads an instruction $I_i$ which has already been loaded and not the word $W_i$ containing the cryptogram $I_i^*$. However, this latter variant may have a lower level of security than the other variants.

In one variant, the hardware processing path comprises a set of several arithmetic logic units and not a single arithmetic logic unit. In this case, in general, this set comprises arithmetic logic units specialized in executing certain specific instructions. Thus, when one of these specific instructions is decoded, the signals generated by the decoder specifically activate the arithmetic logic unit specialized in executing this specific instruction. For example, the set of several arithmetic logic units may comprise:
one or more coprocessors,
one or more IMC ("In Memory Computing") memories, each capable of processing the data which they store.

In one variant, the processing path is not located in a microprocessor but in a coprocessor or in an IMC memory.

In another variant, the various stages of the hardware processing path are distributed differently. In particular, it is not necessary for all the stages of the processing path to be located on the same die. For example, in one variant, the instruction loader and the decoder are located on a die of the microprocessor, whereas the arithmetic logic unit is located on another die, such as, for example, the die of an IMC memory. In another variant, it is the constructor 42 and the checker 44 which are implemented on another die.

In one variant, the instructions $I_i$ are not all of the same size. In this case, the words $W_i$ are not all of the same size either.

Variants of the Construction of the Signature $S_i$:

In one variant, the signature $S_i$ is constructed, in addition, on the basis of signals originating from one or more stages following the decoder 22 in the processing path 10. For example, the signals generated by the unit 24 are used to construct the signature $S_i$.

In one particular variant, only the signals generated by one or more stages following the decoder 22 are used to construct the signature $S_i$. In this case, the signals generated by the decoder 22 are not used. For example, only the signals generated by the unit 24 when it executes the instruction $I_i$ are used to construct the signature $S_i$. In this particular variant, it is therefore necessary to wait for the instruction $I_i$ to be executed before the constructed signature $S_i$ can be compared with the signature $Sref_i$. In other words, in this variant, the integrity of the instruction $I_i$ cannot be checked immediately after it has been decoded by the decoder 22.

In a simplified embodiment, the signature $S_i$ is constructed only on the basis of the configuration signal which codes the opcode of the instruction $I_i$ or only on the basis of the configuration signals which vary in accordance with the one or more values of the operands of the instruction $I_i$.

Other embodiments of the function f( ) are possible. For example, the CBC-MAC function is replaced by another message authentication function such as the function known by the acronym H-MAC ("Hash-based Message Authentication Code").

In a simplified embodiment, the function f( ) does not use a secret key. In this case, the authenticity of the machine code is not guaranteed. For example, the function f( ) is a function known by the acronym CRC ("Cyclic Redundancy Check") or a function known by the acronym MISR ("Multiple-Input Signature Registers").

In one variant, the function f( ) does not behave like a CSPRNG. In this case, the described method makes it possible, all the same, to dissimulate the machine code.

There are other possibilities for obtaining the initial signature $Sref_0$. For example, the microprocessor 2 is configured to construct the initial signature $Sref_0$ on the basis of the first word $W_1$ of the machine code 32. By way of illustration, the signature $Sref_0$ is taken as equal to the first word $W_1$. In this latter case, the signature $Sref_0$ is public.

Variants of the Decryption:

Other functions $g^{-1}( )$ are possible. For example, the function $g^{-1}( )$ is defined by the following relationship: $i_i = (i^*_i + S_{i-1})$ modulo(n), where:

"modulo" is the operation of modular arithmetic which associates the remainder of the Euclidean division of a by b with the pair of integers (a, b), n is the divisor of the modular operation, and $(i^*_i + S_{i-1})$ is the result of the arithmetic addition of $I^*_i$ and $S_{i-1}$.

In this example, n is a predetermined integer which is greater than two. For example, n is equal to 32.

Another possible example of a function $g^{-1}( )$ is that defined by the following relationship: $i_i = i^*_i$ XOR $S_{i-1}$ XOR $k_s$, where $k_s$ is the secret key known only to the computer 2.

Computing power allowing, the function $g^{-1}( )$ may also be a, for example symmetric, decryption function. The signature $S_{i-1}$ can then be used as a decryption key. In another example, the decryption key is the secret key $k_s$, which is independent of the signatures $S_i$. In this latter example, it is a combination of the bits of the cryptogram $I^*_i$ and of the signature $S_{i-1}$ which is decrypted using the key $k_s$. Each time that the function $g^{-1}( )$ is modified, the encryption function go should be adapted accordingly.

Other embodiments are possible for encrypting the reference signatures contained in the machine code. For example, in one variant, the cryptogram $Sref_i^*$ contained in the word $W_{i+1}$ is obtained using the following relationship: $Sref_i^* = g(Sref_i; Sref_i)$ and not the relationship $Sref_i^* = g(Sref_i; Sref_{i-1})$. This variant has the advantage that, whatever the word $W_i$ of the machine code is, the key used to decrypt the cryptogram which it contains is the signature $Sref_{i-1}$. Thus, it is not necessary to know whether the word $W_i$ contains the cryptogram of an instruction or of a reference signature to be capable of selecting the decryption key. However, in this case, this imposes additional constraints on the choice of the encryption function g( ). For example, the encryption function go can no longer be a simple "EXCLUSIVE OR" as described above as the result of $Sref_i$ XOR $Sref_i$ is systematically null. One example of a function g( ) which is suitable in this case is a symmetric encryption function.

Another decryption function $g^{-1}( )$ can be used instead of the function $g^{-1}( )$ when the cryptogram to be decrypted is that of a reference signature. For example, whereas the "EXCLUSIVE OR" function is used to decrypt the cryptograms $I_i^*$, the function $g^{-1}( )$ is a symmetric decryption function which uses a predetermined secret key $ks_{ref}$.

Variants of the Integrity Check:

Other solutions are possible for identifying that the loaded word contains a reference signature and not an instruction. For example, in one particular embodiment, each word $W_i$ containing the cryptogram $I_i^*$ of an instruction is followed by a word $W_{i+1}$ containing all or part of the cryptogram $Sref_i^*$. In this case, each even word loaded from the series of instructions contains a cryptogram of a reference signature. It is then not necessary for the instruction $I_i$ to be a branch instruction which indicates that the following word of the machine code contains the cryptogram $Sref_i^*$. In one variant of the preceding embodiment, the size of the words $W_i$ is increased so as to store, in each word $W_i$, both the cryptogram $I_i^*$ and the cryptogram $Sref_i^*$. In this latter variant, the cryptogram $Sref_i^*$ is not stored in the additional word $W_{i+1}$.

Instructions other than the branch instructions can be used to trigger the integrity check. For example, in one variant, the machine code comprises a specific instruction which, when it is executed by the unit 24, indicates that the following word contains all or part of the cryptogram $Sref_i^*$ and triggers the decryption of the cryptogram $Sref_i^*$ then its comparison with the constructed signature $S_i$.

In one variant, the cryptogram $Sref_i^*$ is contained in the word which precedes the word $W_i$ containing the cryptogram $I_i^*$ and not in the word $W_{i+1}$ as described above. In this case, the instruction contained in the word $W_{i-2}$ causes the signature $Sref_i$ to be decrypted and loaded into the checker 44 and the checker compares the loaded signature $Sref_i$ with the signature $S_i$ constructed after the decoder 22 has decoded the instruction $I_i$.

In another variant, the reference signatures are not stored in the instruction memory which contains the machine code 32. For example, the reference signatures are stored in a secure memory which is independent of the instruction memory containing the cryptograms $I_i^*$. Typically, the secure memory is a memory which can only be accessed by the checker 44. In this case, it is not necessary for the reference signatures to be stored in this secure memory in the form of cryptograms. In this variant, the machine code comprises cryptograms of loading instructions. After decryption, this loading instruction is executed. Its execution causes the reference signature stored in the secure memory to be loaded. For example, in response to the execution of such a loading instruction, the reference signature is loaded into the checker 44 then used to check the signature constructed for a decoded instruction.

In one variant, only part of the cryptogram $Sref_i^*$ is stored in a word of the machine code. The other part of this cryptogram $Sref_i^*$ is stored elsewhere, for example in the secure memory mentioned in the preceding paragraph.

Other mechanisms for updating the signatures, which are different from the GPSA mechanism, are possible. For example, in one variant, each time a branch instruction is executed, this triggers the loading, for example from a secure memory, of a reference signature associated with this branch instruction.

Other Variants:

In one variant, only certain instructions of the machine code are encrypted. For example, for this purpose, a specific instruction is added to the instruction set of the microprocessor 2. When this specific instruction is executed by the unit 24, it indicates to the microprocessor that the next T instructions are not encrypted instructions and should therefore not be decrypted. Typically, the number T is an integer which is greater than or equal to 1 or 10 or 100.

Each word $W_i$ may contain metadata in addition to the cryptogram $I_i^*$. For example, these metadata make it possible to check the integrity or the authenticity of the cryptogram $I_i^*$ before the latter is loaded by the processing path 10. These metadata can also be used to indicate that the word $W_i$ contains the cryptogram of a reference signature or, on the contrary, the cryptogram of an instruction.

According to another variant, it is a specific bit from a status or control register of the microprocessor 2 which indicates whether or not the loaded word contains the cryptogram of an instruction. More specifically, when this specific bit takes a predetermined value, the loaded word is treated by the path 10 as an instruction. If this specific bit takes a value which is different from this predetermined value, then the loaded word is treated as a reference signature.

When the machine code 30 is compiled, the step 76 can be performed at the same time as the step 72. In this case, during the step 72, for each branch instruction, the compiler 60 additionally computes the corresponding signature $Sref_i$ and inserts it into the word $W_{i+1}$ which follows this branch instruction. In this case, preferably, during the step 74 each signature $Sref_i$ is encrypted using exactly the same algorithm as that used to encrypt the instructions $I_i$ so that, during the step 74, the compiler does not have to distinguish the words which contain an instruction in cleartext from the words which contain a signature in cleartext.

Several of the various embodiments described here can be combined with one another.

SECTION IV: ADVANTAGES OF THE DESCRIBED EMBODIMENTS

In the embodiments described here, the instructions of the machine code are not stored in cleartext in the main memory, this making it more difficult to analyse the machine code. The signature $S_i$ is constructed on the basis of the signature $S_{i-1}$, which is itself dependent on the preceding instruction $I_{i-1}$ and on the preceding signature $S_{i-2}$. Thus, by recursivity, the signature $S_{i-1}$ used to decrypt the instruction $I_i$ depends on all the previously executed instructions. Consequently, an error in the decryption of an instruction $I_i$ makes it impossible to decrypt all the following instructions. The integrity of the code is therefore guaranteed with a very high level of security. In particular, the embodiments described here make it possible to trigger the signalling of a lack of integrity in the event of an instruction being modified or of instructions being skipped. In addition, the signature $S_i$ depends on the set $Id_i$ of configuration signals. Consequently, the embodiments described here also make it possible to trigger the signalling of a lack of integrity in the event of the instruction being modified after it has been decoded, that is to say typically in the event of an error in the decoding of the instruction.

Comparing the constructed signature $S_i$ with a prestored reference signature $Sref_i$ makes it possible to detect a lack of integrity without having to decrypt and to execute the following instruction $I_{i+1}$ for this purpose. More specifically, this makes it possible to detect a lack of integrity without relying on the fact that decrypting a cryptogram $I_{i+n}^*$ of a following instruction necessarily produces an erroneous instruction $I'_{i+n}$ which does not belong to the instruction set of the microprocessor 2 if the integrity of the instruction $I_i$ has been compromised, where n is an integer which is greater than or equal to one. Thus, comparing the signature $S_i$ with the reference signature $Sref_i$ makes it possible to detect a lack of integrity even when the instruction set of the computer is not sparse. This comparison also makes it possible to limit the number of unexpected behaviours of the computer and therefore to increase the security of the method.

Decrypting the reference signature using a signature constructed for one of the instructions in the series of instructions makes it possible to increase the security of the method. Indeed, the reference signature is dissimulated and, in addition, it can be decrypted correctly only if the series of previously decrypted instructions is intact.

Decrypting the cryptogram of the reference signature $Sref_i$ on the basis of the constructed signature $S_{i-1}$ or $S_i$ makes it possible to simplify the operation of the computer as the same function go is used whether the cryptogram to be decrypted is that of an instruction or of a reference signature.

Using a secret key to construct the signature $S_i$ additionally makes it possible to authenticate the code as only authentic machine code comprises a series of instructions encrypted using this same secret key.

Using only the signals generated by the decoder to construct the signature $S_i$ makes it possible to accelerate the execution of the machine code. Indeed, in this case, it is not necessary to wait for the instruction $I_i$ to be processed by a stage following the decoder 22 in order for the signature $S_i$ to be able to be constructed then compared with the signature $Sref_i$.

Constructing the signature $S_i$ in accordance with the opcode and with the operands of the instruction $I_i$ strengthens the guarantee of the integrity of the code as any modification of the instruction $I_i$ leads the signature $S_i$ to be modified.

The invention claimed is:

1. A method for executing a machine code with a computer comprising a hardware instruction processing path, said hardware processing path comprising a sequence of stages which process, one after another, each instruction to be executed of the machine code, said sequence of stages comprising an instruction loader, a decoder, and an arithmetic logic unit, said method comprising executing, for each cryptogram of an instruction in a series of consecutive instructions of the machine code:
  the instruction loader loading the cryptogram of an instruction designated by a program counter in order to obtain a loaded cryptogram,
  decrypting the loaded cryptogram in order to obtain a decrypted instruction,
  the decoder decoding the decrypted instruction in order to generate signals which configure the computer to execute the decrypted instruction, and
  the arithmetic logic unit executing the decrypted instruction,
  wherein the method further comprises, for a current instruction in the series of consecutive instructions:
    after decoding the current instruction and before decrypting a cryptogram of a following instruction in the series of consecutive instructions, constructing a signature for the current instruction:
      (1) based on a set of signals, which are generated by a stage in a sequence of stages in response to processing of said current instruction by said stage, said stage that generates said set of signals being the decoder or a stage following the decoder in the sequence of stages, and (2) based on a preceding signature constructed for the instruction that precedes the current instruction in the series of consecutive instructions, said signature for the current instruction thus varying in accordance with the current instruction and in accordance with all instructions preceding the current instruction in the series of consecutive instructions, checking an integrity of the executed machine code by comparing the constructed signature for the current instruction with a prestored reference signature, and only when the integrity of the current instruction has been checked successfully, decrypting the cryptogram of the following instruction using the constructed signature for the current instruction.

2. The method according to claim 1, wherein the step of checking the integrity comprises:

loading a cryptogram of the reference signature, and decrypting said cryptogram of the reference signature using one of the signatures constructed for one of the instructions in the series of consecutive instructions.

3. The method according to claim 2, further comprising:

loading the cryptogram of the reference signature from an address contained in the program counter after a cryptogram of the current instruction is loaded and before the cryptogram of the following instruction is loaded, and decrypting the cryptogram of the reference signature using the signature constructed for the current instruction or for an instruction that precedes said current instruction in the series of consecutive instructions.

4. The method according to claim 1, wherein the step of constructing the signature for the current instruction further comprises constructing the signature based on a secret key prestored in a memory of the computer.

5. The method according to claim 1, wherein the stage that generates the set of signals that is used to construct the signature is the decoder.

6. The method according to claim 5, wherein the step of constructing the signature for the current instruction further comprises constructing the signature based on the basis of signals, generated by the decoder in response to the decoding of the current instruction, which vary in accordance with an opcode of the current instruction and in accordance with each operand of the current instruction.

7. The method according to claim 1, wherein the step of decrypting the cryptogram of the following instruction using the constructed signature comprises performing an "EXCLUSIVE OR" between bits of the cryptogram of the following instruction and bits of the signature constructed for the current instruction, which precedes said following instruction in the series of consecutive instructions.

8. The method according to claim 1, wherein, when the signature constructed for the current instruction is different from the prestored reference signature, the step of checking the integrity of the current instruction is followed by a step of signalling a lack of integrity.

9. A machine code which can be executed by implementing the method according to claim 1, said machine code comprising the cryptogram for each instruction in the series of consecutive instructions, wherein:

each of the cryptograms is a ciphertext of a corresponding instruction in said series of consecutive instructions using a signature constructed:

based on the signals generated by a stage in the sequence of stages in response to the decoding of said corresponding instruction by said stage, said stage that generates said set of signals being the decoder or a stage following the decoder in the sequence of stages, and based on the preceding signature constructed for an instruction that precedes the corresponding instruction in the series of consecutive instructions, said signature for the corresponding instruction thus varying in accordance with the corresponding instruction and in accordance with all the instructions preceding the corresponding instruction in the series of consecutive instructions, and the machine code further comprises the prestored reference signature with which the constructed signature for the current instruction is compared when said machine code is executed.

10. A non-transitory information storage medium that can be read by a microprocessor of the computer, wherein the storage medium comprises the machine code according to claim 9.

11. A computer, comprising:

a hardware instruction processing path, said hardware processing path comprising a sequence of stages which process, one after another, each instruction to be executed of the machine code, said sequence of stages comprising an instruction loader, a decoder, and an arithmetic logic unit, said hardware processing path being configured to, for each cryptogram of an instruction in a series of consecutive instructions of a machine code, execute:

the instruction loader loading the cryptogram of an instruction designated by a program counter in order to obtain a loaded cryptogram, and ypting the loaded cryptogram in order to obtain a decrypted instruction, decoder decoding the decrypted instruction in order to generate signals which configure the computer to execute the decrypted instruction, and the arithmetic logic unit executing the decrypted instruction, wherein the hardware processing path is further configured to execute, for a current instruction in the series of consecutive instructions:

after decoding the current instruction and before decrypting a cryptogram of a following instruction in the series of consecutive instructions, constructing a signature for the current instruction:

(1) based on the signals generated by a stage in the sequence of stages in response to the decoding of said current instruction by said stage, said stage that generates said set of signals being the decoder or a stage following the decoder in the sequence of stages, and (2) based on a preceding signature constructed for the instruction that precedes the current instruction in the series of consecutive instructions, said signature for the current instruction thus varying in accordance with the current instruction and in accordance with all instructions preceding the current instruction in the series of consecutive instructions, checking an integrity of the current instruction by comparing the constructed signature for the current instruction with a prestored reference signature, and only when the integrity of the current instruction has been checked successfully, decrypting the cryptogram of the following instruction using the constructed signature for the current instruction.

12. A compiler configured to automatically transform a source code of a computer program into a binary code comprising the machine code that can be executed by the computer comprising the hardware instruction processing path, said hardware processing path comprising the instruction loader, the decoder, and the arithmetic logic unit, wherein said machine code is according to claim 9.

* * * * *